US012764488B2

(12) United States Patent
Jeong et al.

(10) Patent No.: US 12,764,488 B2
(45) Date of Patent: Oct. 13, 2026

(54) BITSTREAM RECONSTRUCTION METHOD AND APPARATUS FOR SPATIAL AUDIO RENDERING

(71) Applicant: Electronics and Telecommunications Research Institute, Daejeon (KR)

(72) Inventors: Young Ho Jeong, Daejeon (KR); Kyeongok Kang, Daejeon (KR); Soo Young Park, Daejeon (KR); Jae-hyoun Yoo, Daejeon (KR); Yong Ju Lee, Daejeon (KR); Tae Jin Lee, Daejeon (KR); Dae Young Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 222 days.

(21) Appl. No.: 18/426,984

(22) Filed: Jan. 30, 2024

(65) Prior Publication Data

US 2024/0357306 A1 Oct. 24, 2024

(30) Foreign Application Priority Data

Apr. 19, 2023 (KR) ........................ 10-2023-0051316

(51) Int. Cl.
*H04S 7/00* (2006.01)

(52) U.S. Cl.
CPC ........... *H04S 7/303* (2013.01); *H04S 2400/11* (2013.01)

(58) Field of Classification Search
CPC ...... H04S 7/303; H04S 2400/11; H04S 7/306; H04S 7/304; H04S 2420/11; H04S 3/008; H04S 5/00; H04S 5/033; H04S 7/30; H04S 7/302; H04S 7/305; G02B 27/017; G06F 3/165; G06T 17/00; G10L 19/008; G10L 19/167; G10L 21/0272; H04R 3/005; H04R 5/033
See application file for complete search history.

(56) References Cited

U.S. PATENT DOCUMENTS

| | | | | |
|---|---|---|---|---|
| 10,200,806 | B2 * | 2/2019 | Stein | H04S 7/305 |
| 11,429,340 | B2 | 8/2022 | Munoz et al. | |
| 11,432,099 | B2 * | 8/2022 | Terentiv | H04S 3/008 |
| 11,758,348 | B1 * | 9/2023 | King | H04S 5/00 381/17 |
| 2013/0142341 | A1 * | 6/2013 | Del Galdo | H04S 7/30 381/23 |
| 2018/0068664 | A1 * | 3/2018 | Seo | H04S 3/008 |
| 2018/0197551 | A1 * | 7/2018 | Mcdowell | H04S 7/30 |

(Continued)

FOREIGN PATENT DOCUMENTS

| | | |
|---|---|---|
| KR | 10-2019-0028706 A | 3/2019 |
| KR | 10-2021-0148238 A | 12/2021 |

*Primary Examiner* — Gerald Gauthier
(74) *Attorney, Agent, or Firm* — NSIP Law

(57) ABSTRACT

A bitstream reconstruction method and apparatus are provided. The method includes constructing an initial bitstream by rendering sound source information and geometry information within a reference radius from an initial location of a user accessing a virtual space into spatial audio, collecting location information according to a movement of the user within the virtual space, and reconstructing, based on a relationship between the reference radius and a movement radius identified according to the collected location information, the initial bitstream constructed by corresponding to the initial location of the user.

13 Claims, 7 Drawing Sheets

(56) References Cited

U.S. PATENT DOCUMENTS

| | | | | |
|---|---|---|---|---|
| 2019/0198028 | A1* | 6/2019 | Kim | G10L 19/167 |
| 2019/0289417 | A1* | 9/2019 | Tomlin | G06F 3/165 |
| 2019/0387350 | A1* | 12/2019 | Audfray | G02B 27/017 |
| 2019/0387352 | A1* | 12/2019 | Jot | G02B 27/017 |
| 2020/0396560 | A1* | 12/2020 | Family | H04S 7/305 |
| 2021/0398545 | A1* | 12/2021 | Johnson | H04S 7/306 |
| 2022/0345843 | A1* | 10/2022 | Connolly | H04S 7/302 |
| 2023/0100071 | A1* | 3/2023 | Eronen | H04S 7/305 381/303 |
| 2023/0104111 | A1* | 4/2023 | Murgai | H04S 7/304 381/303 |
| 2023/0300556 | A1* | 9/2023 | Marchan | H04R 5/033 381/303 |
| 2024/0048936 | A1* | 2/2024 | Leppanen | H04S 7/303 |
| 2024/0098442 | A1* | 3/2024 | Messingher Lang | H04S 7/304 |
| 2024/0098445 | A1* | 3/2024 | Herre | G10L 21/0272 |
| 2024/0107259 | A1* | 3/2024 | Hur | H04R 3/005 |
| 2024/0129685 | A1* | 4/2024 | Jia | H04S 7/303 |
| 2024/0137720 | A1* | 4/2024 | Chi | H04R 3/005 |
| 2024/0244388 | A1* | 7/2024 | Ye | G10L 19/008 |
| 2024/0267695 | A1* | 8/2024 | Xu | G06T 17/00 |
| 2024/0284137 | A1* | 8/2024 | Messingher Lang | H04S 7/303 |
| 2024/0314509 | A1* | 9/2024 | Nawfal | H04S 7/30 |
| 2024/0357306 | A1* | 10/2024 | Jeong | H04S 7/304 |
| 2024/0420676 | A1* | 12/2024 | Koppens | G10K 15/12 |
| 2025/0266909 | A1* | 8/2025 | Shang | H04B 11/00 |

* cited by examiner

<Frequency f="125.0" c="0.0" r="0.0" s="0.0" t="1.0"/>
<Frequency f="250.0" c="0.0" r="0.0" s="0.0" t="1.0"/>
<Frequency f="500.0" c="0.0" r="0.01" s="0.01 t="0.98"/>
<Frequency f="1000.0" c="0.0" r="0.01" s="0.04" t="0.95"/>
<Frequency f="2000.0" c="0.0" r="0.03" s="0.06" t="0.91"/>
<Frequency f="4000.0" c="0.0" r="0.04" s="0.09" t="0.87"/>
<Frequency f="8000.0" c="0.0" r="0.06" s="0.11" t="0.83"/>

FIG. 2

| Sound source ID | Sound source type | Sound source location | Acoustic reach distance |
|---|---|---|---|
| Siren | Point | (x1, y1, z1) | D_1 |
| Train | Line | (x2, y2, z2) | D_2 |
| Piano | Surface | (x3, y3, z3) | D_3 |
| ... | ... | ... | ... |

BITSTREAM RECONSTRUCTION METHOD AND APPARATUS FOR SPATIAL AUDIO RENDERING

CROSS-REFERENCE TO RELATED APPLICATIONS

This application claims the benefit under 35 USC § 119 (a) of Korean Patent Application No. 10-2023-0051316, filed on Apr. 19, 2023, in the Korean Intellectual Property Office, the entire disclosure of which is incorporated herein by reference for all purposes.

BACKGROUND

1. Field

The following description relates to a bitstream reconstruction method and apparatus for spatial audio rendering, and more particularly, to a bitstream reconstruction method and apparatus for spatial audio rendering in a large virtual space such as metaverse.

2. Description of Related Art

Recently, with the development of virtual reality (VR) games and the availability of ultra-high-speed/ultra-low-latency mobile connections, metaverse has been in the spotlight. Metaverse is a compound word of 'meta,' meaning transcendence, and 'universe,' meaning world. In other words, the metaverse may be said to be another world interconnected with reality where one may conduct realistic economic, social, and cultural activities through one's avatar that exists in the virtual world.

In order to ensure user immersion in such a virtual space, not only real-time processing of highly realistic three-dimensional (3D) graphics comparable to reality but also real-time rendering of spatial audio that changes in conjunction with the location and head movement of a user wearing a head mounted display (HMD) is essential.

Moving Picture Experts Group Immersive (MPEG-I) Immersive Audio technology, which is currently being standardized, is under development based on a mechanism that generates a bitstream by encoding information necessary for spatial audio rendering in advance for a small virtual space and transmits the bitstream to a terminal through a one-way data transmission channel such as a broadcast channel for rendering spatial audio according to the head movement at the location of the user.

However, most current metaverse services have a structure in which continuous expansion is possible based on the premise of a large virtual space and changes in the virtual space (e.g., creation and deletion of a sound source object and a geometry object) frequently occur due to multiple users accessing the metaverse based on a two-way communication channel. As a result, whenever a change occurs in the virtual space, a bitstream including spatial audio-related information for the entire large virtual space needs to be generated, a large amount of bitstream needs to be provided to all of the multiple users accessing the metaverse at different times, and other various problems may arise.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure provides a method and apparatus for reducing a bitstream generation load in situations such as changes in a virtual space frequently caused due to users by selecting only spatial audio-related information within a determined range based on the location of a user in the virtual space and reconstructing a bitstream.

However, technical aspects are not limited to the foregoing aspect and there may be other technical aspects.

In one general aspect, a bitstream reconstruction method includes constructing an initial bitstream by rendering sound source information and geometry information within a reference radius from an initial location of a user accessing a virtual space into spatial audio, collecting location information according to a movement of the user within the virtual space, and reconstructing, based on a relationship between the reference radius and a movement radius identified according to the collected location information, the initial bitstream constructed by corresponding to the initial location of the user.

The sound source information may include an acoustic reach distance from the identified location that is determined based on an identification location of an individual sound source object that exists within the reference radius from the initial location of the user and a type of the individual sound source object.

The acoustic reach distance may be determined using a distance attenuation gain threshold value that is set to different values according to a type of the individual sound source object.

The sound source information may include directivity characteristic information indicating an amount of energy emitted from the individual sound source object according to an azimuth angle and an elevation angle.

The geometry information may include acoustic material characteristic information classified by a frequency range in order to simulate a change in a characteristic, due to an individual geometry object, of an acoustic signal that is transmitted from an individual sound source object included in the sound source information to the user.

The acoustic material characteristic information may include at least one parameter among a coupling coefficient, a specular reflection coefficient, a diffuse scattering coefficient, or a transmission coefficient for the frequency range.

The reconstructing of the initial bitstream may include determining a transition area based on the reference radius when the identified movement radius exceeds the reference radius, identifying a circular area of which a radius is a distance from the initial location of the user to an identification location of an individual sound source object located at the greatest distance from the initial location of the user among individual sound source objects of which an acoustic signal reaches within the determined transition area, and reconstructing the initial bitstream by rendering sound source information and geometry information included in the identified circular area into spatial audio.

In another general aspect, a bitstream reconstruction method includes constructing an initial bitstream by rendering sound source information and geometry information within a reference radius from a location of a user accessing a virtual space into spatial audio, identifying an occurrence of an object creation/deletion event in the virtual space, calculating a distance from the location of the user to objects created or deleted according to the object creation/deletion event, and reconstructing the initial bitstream based on the calculated distance from the location of the user to the objects.

The reconstructing of the initial bitstream may include determining whether an acoustic signal of an individual sound source object created or deleted according to the object creation/deletion event reaches within a transition area determined based on the reference radius, identifying, when it is determined that the acoustic signal of the created or deleted individual sound source object reaches within the determined transition area, a circular area of which a radius is a distance from the location of the user to an identification location of an individual sound source object located at the greatest distance from the location of the user among individual sound source objects of which an acoustic signal reaches within the determined transition area, the individual sound source objects comprising the created or deleted individual sound source object, and reconstructing the initial bitstream by rendering sound source information and geometry information included in the identified circular area into spatial audio.

The reconstructing of the initial bitstream may include determining whether an individual geometry object created or deleted according to the object creation/deletion event exists within an acoustic reach distance of an individual sound source object included in a transition area determined based on the reference radius, identifying, when it is determined that the created or deleted individual geometry object exists within the acoustic reach distance of the individual sound source object included in the transition area, a circular area of which a radius is a distance from the location of the user to an identification location of an individual sound source object located at the greatest distance from the location of the user among individual sound source objects of which an acoustic signal reaches within the determined transition area, and reconstructing the initial bitstream by rendering sound source information corresponding to the identified circular area and geometry information comprising the created or deleted individual geometry object into spatial audio.

In another general aspect, a bitstream reconstruction apparatus includes one or more processors and a memory configured to load or store a program executed by the one or more processors, wherein the program includes instructions that, when executed by the one or more processors, cause the one or more processors to perform constructing an initial bitstream by rendering sound source information and geometry information within a reference radius from an initial location of a user accessing a virtual space into spatial audio, collecting location information according to a movement of the user within the virtual space, and reconstructing, based on a relationship between the reference radius and a movement radius identified according to the collected location information, the initial bitstream constructed by corresponding to the initial location of the user.

The sound source information may include an acoustic reach distance from the identified location that is determined based on an identification location of an individual sound source object that exists within the reference radius from the initial location of the user and a type of the individual sound source object.

The acoustic reach distance may be determined using a distance attenuation gain threshold value that is set to different values according to a type of the individual sound source object.

The sound source information may include directivity characteristic information indicating an amount of energy emitted from the individual sound source object according to an azimuth angle and an elevation angle.

The geometry information may include acoustic material characteristic information classified by a frequency range in order to simulate a change in a characteristic, due to an individual geometry object, of an acoustic signal that is transmitted from an individual sound source object included in the sound source information to the user.

The acoustic material characteristic information may include at least one parameter among a coupling coefficient, a specular reflection coefficient, a diffuse scattering coefficient, or a transmission coefficient for the frequency range.

The one or more processors may be configured to determine a transition area based on the reference radius when the identified movement radius exceeds the reference radius, identify a circular area of which a radius is a distance from the initial location of the user to an identification location of an individual sound source object located at the greatest distance from the initial location of the user among individual sound source objects of which an acoustic signal reaches within the determined transition area, and reconstruct the initial bitstream by rendering sound source information and geometry information included in the identified circular area into spatial audio.

Other features and aspects will be apparent from the following detailed description, the drawings, and the claims.

According to an example of the present disclosure, the bitstream generation load may be reduced in the situations such as changes in the virtual space frequently caused due to users by selecting only spatial audio-related information within a determined range based on the location of the user in the virtual space and reconstructing a bitstream.

In addition, according to an example of the present disclosure, network traffic load may be prevented by reducing the bitstream generation load in the situations such as changes in the virtual space.

BRIEF DESCRIPTION OF THE DRAWINGS

FIG. 2 illustrates an example of acoustic material characteristic information.

Figure 1:
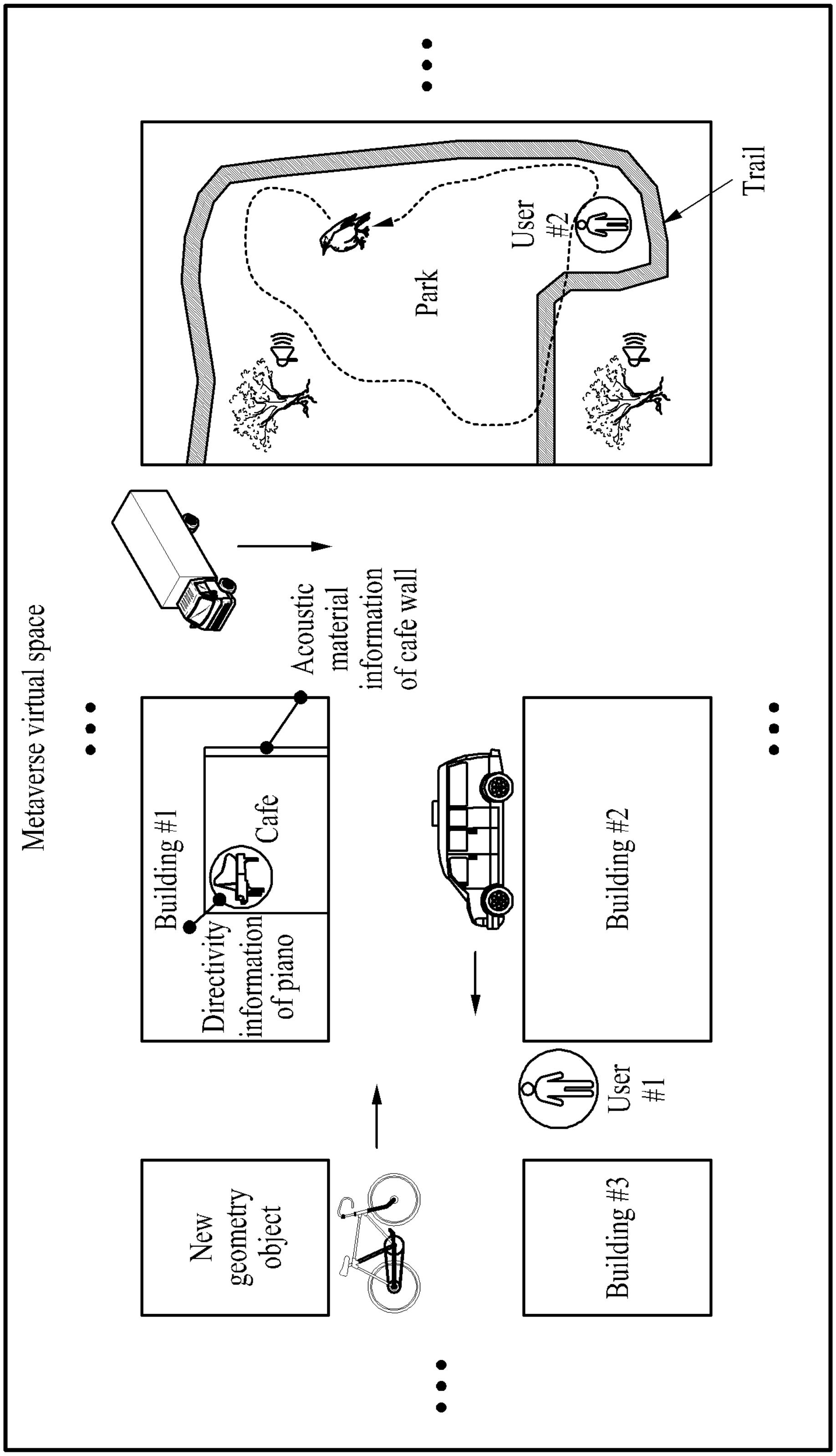
FIG. 1 illustrates an example of a configuration of a metaverse virtual space and spatial audio-related information.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following structural or functional description of examples is provided as an example only and various alterations and modifications may be made to the examples. Thus, an actual form of implementation is not construed as limited to the examples described herein and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a "first" component may be referred to as a "second" component, and similarly, the "second" component may be referred to as the "first" component.

It should be noted that when one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. As used herein, each of "at least one of A and B," "at least one of A or B," "at least one of A, B, and C," "at least one of A, B, or C," and the like may include any one of the items listed together in the corresponding one of the phrases, or all possible combinations thereof. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical and scientific terms have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like components and a repeated description related thereto is omitted.

FIG. 1 illustrates an example of a configuration of a metaverse virtual space and spatial audio-related information.

FIG. 1 shows an example of the configuration of a metaverse virtual space including buildings and a park and spatial audio-related information. As shown in FIG. 1, the metaverse virtual space may be continuously expanded in the process of new creation, modification, or deletion of a geometry object such as a building, store, tree, car, etc. and of a related sound source object by a user or administrator. Users who access such a metaverse virtual space may experience different spatial audio in various environments such as a city street, park, and cafe.

Such spatial audio may be determined based on a complex change in an acoustic signal such as signal attenuation, reflection, and diffraction, which may be analyzed based on geometry information that exists between a sound source and a user. Here, geometry information refers to information of an object that exists in a three-dimensional (3D) space, such as a building, wall, pillar, tree, etc., and may include acoustic material characteristic information as shown in FIG. 2.

More specifically, referring to FIG. 2, the acoustic material characteristic information may have four parameters for each frequency range, including a coupling coefficient c, specular reflection coefficient r, diffuse scattering coefficient s, and transmission coefficient t. The method according to the present disclosure may simulate a change in a characteristic of an acoustic signal caused by a geometry object based on the acoustic material characteristic information. Here, $c+r+s+t\leq 1$ needs to be satisfied.

Figure 3:
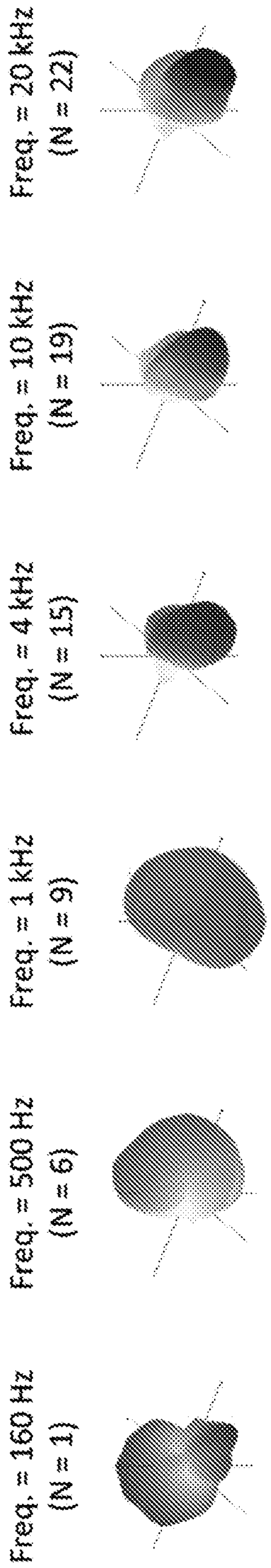
FIG. 3 illustrates an example of directivity characteristic information.

In addition, the sound source may be defined to have directivity characteristic information as shown in FIG. 3. Referring to FIG. 3, the directivity characteristic information may indicate an amount of energy emitted from the sound source according to an azimuth/elevation angle and may have different radiation patterns for each frequency range. In other words, in order to express a spatial acoustic characteristic of a sound source that has large energy in a specific direction, such as a speaker or human vocalization, the directivity characteristic information for such individual sound sources may be needed.

The present disclosure proposes a method of significantly reducing the bitstream generation load in situations such as changes in a virtual space. The method may reconstruct a bitstream by selectively encoding only meaningful spatial audio-related information within a determined range based on the location of a user in a large virtual space and provide a reconstructed bitstream to a terminal to reduce the bitstream generation load.

Figures 4, 5:
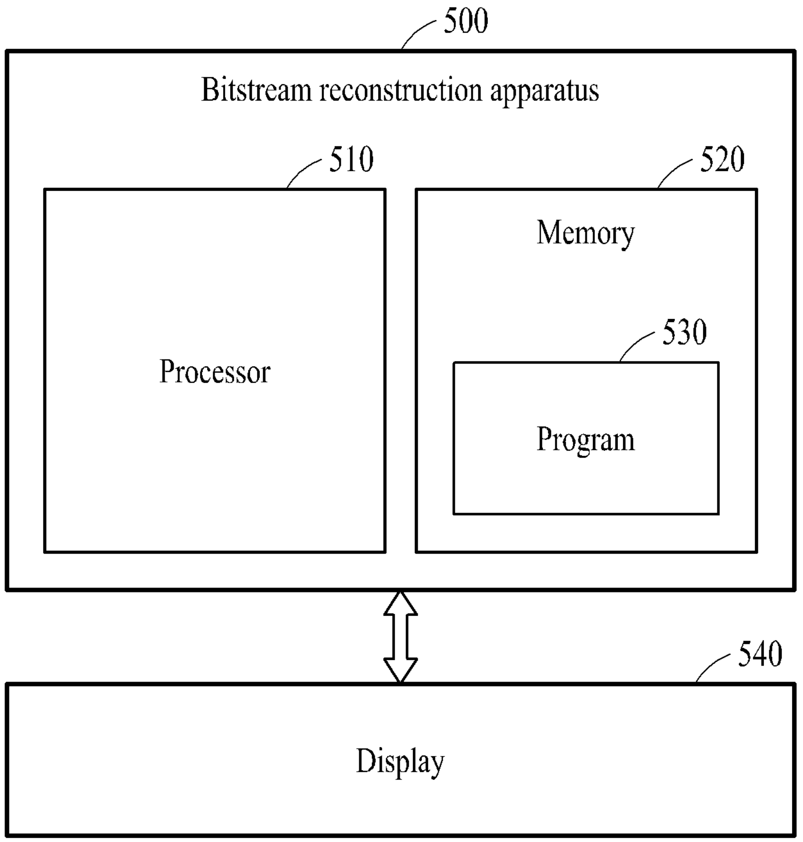
FIG. 4 illustrates an example of information related to an individual sound source.
FIG. 5 illustrates an example of a configuration of a bitstream reconstruction apparatus.

First, the present disclosure may configure a mapping table as shown in FIG. 4 by calculating an acoustic reach distance based on the type and location information of an individual sound source that exists in the virtual space, using sound source information of spatial audio. Here, the calculation formula for calculating the acoustic reach distance of the individual sound source may vary depending on the type of sound source.

For example, a point source may correspond to the sound of a car passing on a road or the sound of a firework exploding, and the acoustic reach distance $D_p$ of the point source may be expressed as Equation 1 below.

$$D_p = 10^{\frac{G_{p\_th}}{20}} \quad \text{[Equation 1]}$$

Here, $G_{p\_th}$ is the distance attenuation gain threshold value for the point source and may be set as $G_{p\_th}=20 \log D_p$.

A line source may correspond to the sound of a motorcade passing on a road or a train passing on a railway, etc., and the acoustic reach distance $D_l$ of the line source may be expressed as Equation 2 below.

$$D_l = 10^{\frac{G_{l\_th}}{10}} \quad \text{[Equation 2]}$$

Here, $G_{l\_th}$ is the distance attenuation gain threshold value for the line source and may be set as $G_{l\_th}=10 \log D_l$.

A surface source may correspond to the sound of a large speaker at a close distance or reflected sound from a wall, etc., and the acoustic reach distance $D_s$ of the surface source may be expressed as Equation 3 below.

$$D_s = \frac{b}{3} 10^{\frac{\left(G_{s\_th} - 10\log\left(\frac{b}{a}\right)\right)}{20}}$$ [Equation 3]

Here, $G_{s\_th}$ is the distance attenuation gain threshold value for the surface source and may be set as $$G_{s\_th} = 20\log\left(\frac{3D_s}{b}\right) + 10\log\left(\frac{b}{a}\right).$$

In addition, the a and b values respectively represent the length of the short side and long side of the surface source.

Here, the distance attenuation gain threshold values $G_{p\_th}$, $G_{l\_th}$, and $G_{s\_th}$ for each type of sound source may be set to different values.

FIG. 5 illustrates an example of a configuration of a bitstream reconstruction apparatus.

Referring to FIG. 5, a bitstream reconstruction apparatus 500 may include one or more processors 510 and a memory 520 for loading or storing a program 530 executed by the one or more processors 510. The components included in the bitstream reconstruction apparatus 500 shown in FIG. 5 are just an example, and one of ordinary skill in the art may understand that other generally used components may be further included in addition to the components illustrated in FIG. 5.

The one or more processors 510 may control an overall operation of each component of the bitstream reconstruction apparatus 500. The one or more processors 510 may include at least one of a central processing unit (CPU), a microprocessor unit (MPU), a microcontroller unit (MCU), a graphics processing unit (GPU), a neural processing unit (NPU), a digital signal processor (DSP), and other well-known types of processors in the art. In addition, the one or more processors 510 may perform an operation of at least one application or program to perform the methods/operations described herein according to the examples. The bitstream reconstruction apparatus 500 may include one or more processors 510.

The memory 520 may store one of or at least one combination of various pieces of data, instructions, and pieces of information that are used by a component (e.g., the one or more processors 510) included in the bitstream reconstruction apparatus 500. The memory 520 may include a volatile memory or a non-volatile memory.

The program 530 may include one or more actions implementing the methods/operations described herein according to the examples and may be stored in the memory 520 as software. In this case, an operation may correspond to an instruction that is implemented in the program 530. For example, the program 530 may include instructions that, when executed by the one or more processors 510, cause the one or more processors 510 to perform constructing an initial bitstream by rendering sound source information and geometry information within a reference radius from an initial location of a user accessing a virtual space into spatial audio, collecting location information according to a movement of the user within the virtual space, and reconstructing the initial bitstream constructed by corresponding to the initial location of the user based on a relationship between the reference radius and a movement radius identified according to the collected location information.

When the program 530 is loaded in the memory 520, the one or more processors 510 may execute a plurality of operations to implement the program 530 and perform the methods/operations described herein according to the examples.

An execution screen of the program 530 may be displayed on a display 540. Although the display 540 is illustrated as a separate device connected to the bitstream reconstruction apparatus 500 in FIG. 5, the display 540 may be one of the components of the bitstream reconstruction apparatus 500 in the case that the bitstream reconstruction apparatus 500 is a portable terminal of a user, such as a smartphone, a tablet, and the like. The screen displayed on the display 540 may be a state before information is input to the program 530 or may be an execution result of the program 530.

Figure 6:
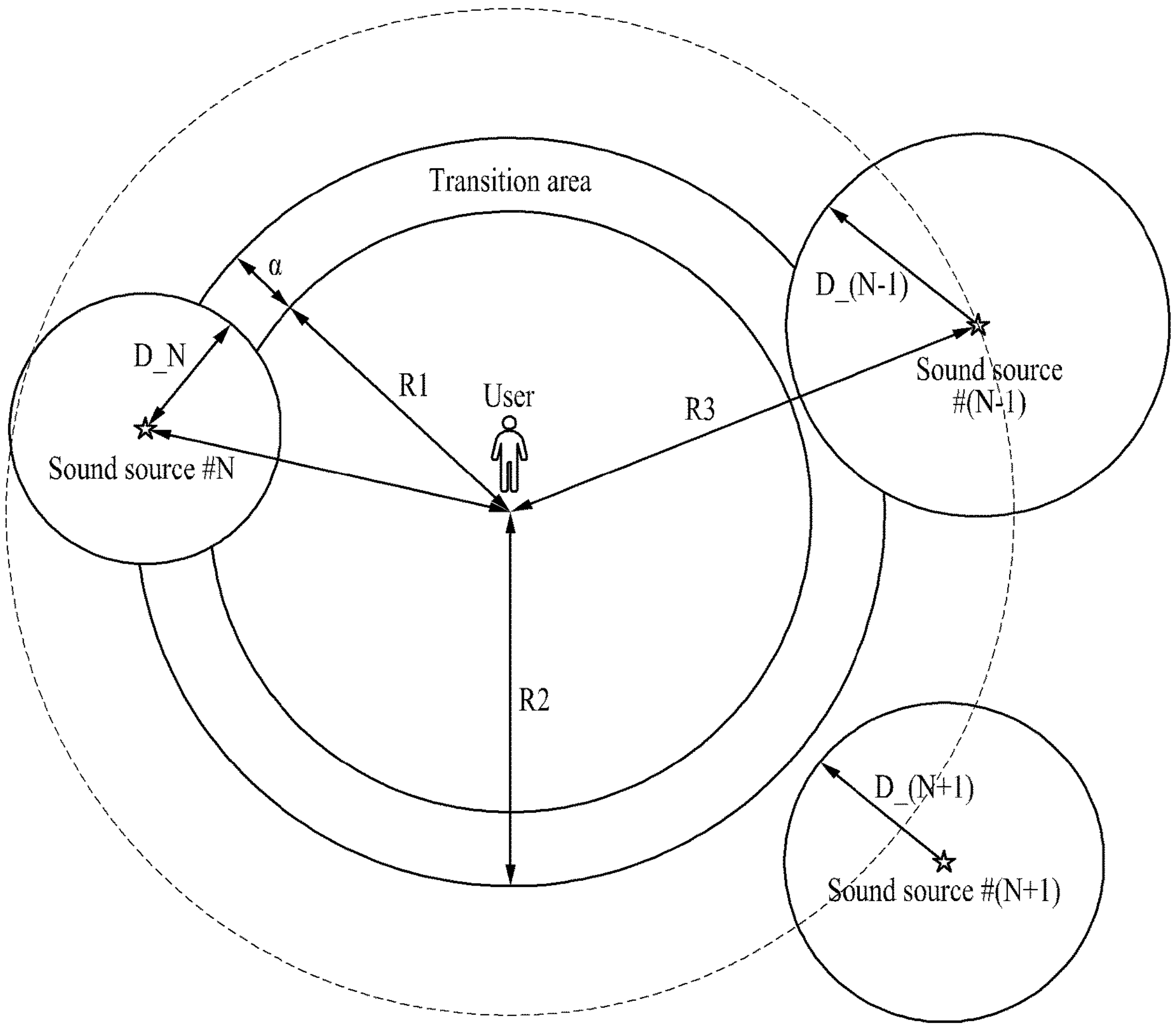
FIG. 6 illustrates an example of a method of analyzing sound source information based on a location of a user for bitstream reconstruction.

FIG. 6 illustrates an example of a method of analyzing sound source information based on a location of a user for bitstream reconstruction.

As shown in FIG. 6, the one or more processors 510 of the bitstream reconstruction device 500 may configure an initial bitstream for spatial audio rendering based on an initial location value of the user accessing a metaverse virtual space and transmit the initial bitstream to a user terminal. Here, a circular area with a radius R1 centered on the user is a fixed area in which bitstream reconstruction does not occur even when the user moves.

This fixed area may be set based on statistical information on the user movement and information related to spatial audio rendering in the virtual space, or by considering the trade-off between the size of the bitstream and the number of times bitstream reconstruction occurs. When the R1 value in the virtual space is set to a large value, the number of locations to which the user may move within the radius R1 centered on the location of the user may increase. Since information necessary for spatial audio rendering exists at each of the locations, the size of the transmitted bitstream (i.e., information within an R2 area including an actual transition area) may also increase. However, as the R1 value increases, the number of times bitstream reconstruction occurs due to the user movement may relatively decrease.

On the contrary, when the R1 value in the virtual space is set to a small value, bitstream reconstruction due to the user movement may relatively frequently occur, but the size of the transmitted bitstream may decrease since the locations to which the user may move may decrease.

Therefore, the one or more processors 510 may determine the R1 value in the virtual space based on statistical information on the movement pattern of the user according to the type of virtual space (outdoors/indoors, etc.) by, for example, setting the R1 value to a small value when the movement is not frequent, and on the size of the information related to spatial audio rendering by, for example, setting the R1 value to a small value when the information size is large.

When the user leaves the fixed area with the radius R1, the one or more processors 510 may unconditionally proceed with bitstream reconstruction. In this case, the one or more processors 510 may set a circular area with a radius R2, that is, a transition area, to resolve the discontinuity of spatial audio rendering that may occur as the user moves out of the circular area with the radius R1.

The transition area may be determined in the circular area with the radius R1 based on Equation 4 below.

$$R2 = R1 + \alpha$$ [Equation 4]

The one or more processors 510 may set a circular area with a radius R3, that is, a reconstruction area. The radius R3 may be the distance from the initial location of the user to a sound source at the greatest distance from the initial location of the user (for example, a sound source #(N−1) of FIG. 6) among sound sources reaching within the transition area with the radius R2. The one or more processors 510 may perform spatial audio analysis based on geometry information and a sound source included in the reconstruction area (for example, a sound source #N and the sound source #(N−1) of FIG. 6) to reconstruct the initial bitstream constructed by corresponding to the initial location of the user.

Figure 7:
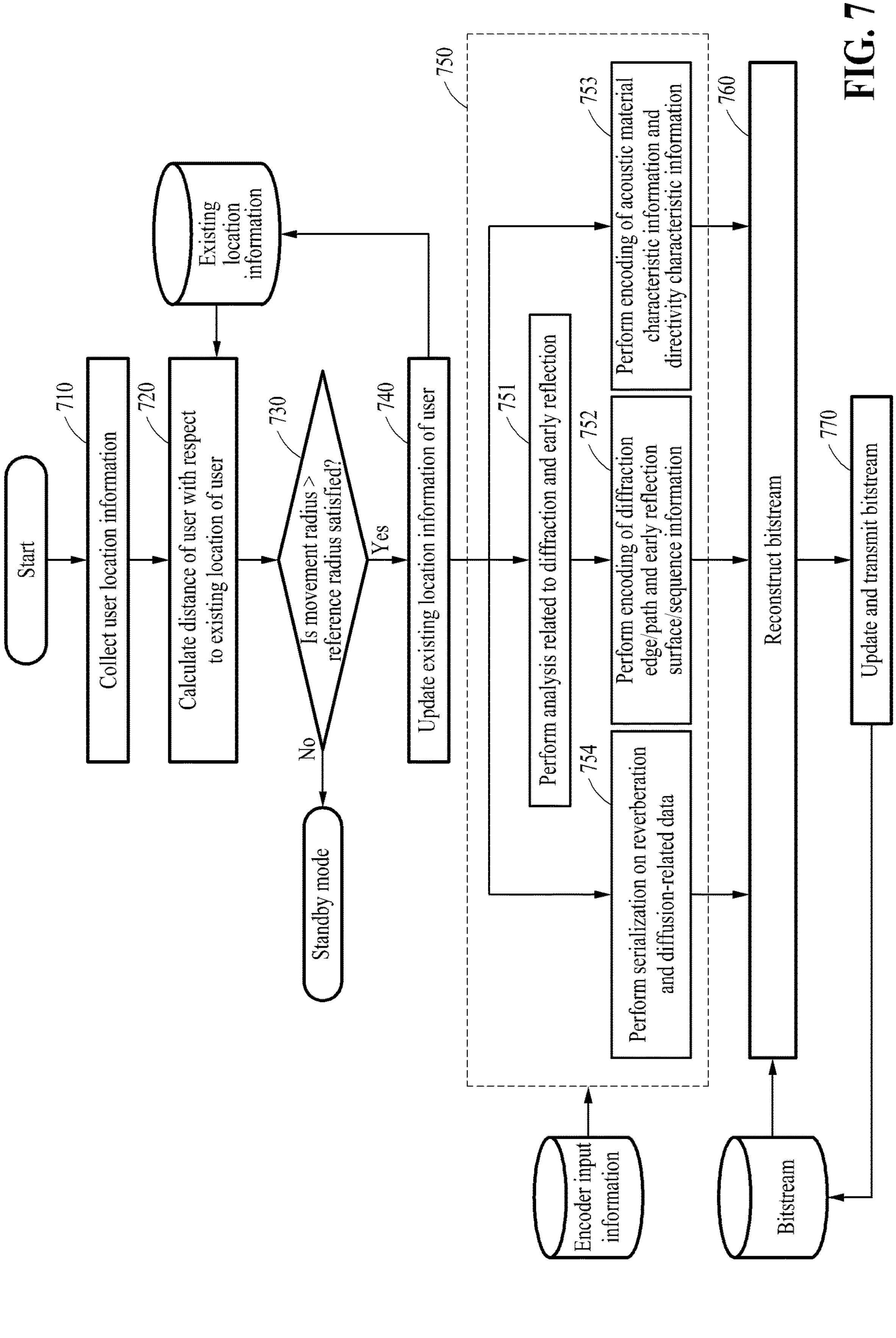
FIG. 7 illustrates an example of a bitstream reconstruction method according to a movement of a user in a virtual space.

FIG. 7 illustrates an example of a bitstream reconstruction method according to a movement of a user in a virtual space.

First, in operation 710, the one or more processors 510 may collect user location information according to the movement of the user in the virtual space.

In operation 720, the one or more processors 510 may calculate a distance of a user with respect to an existing location of the user based on the collected user location information. Here, the calculated distance may indicate a movement radius of the user that is identified according to the collected user location information.

In operation 730, the one or more processors 510 may determine whether the movement radius of the user exceeds a reference radius. Here, the reference radius may correspond to the radius R1 of FIG. 6. When the movement radius of the user does not exceed the reference radius, the one or more processors 510 may switch to a standby mode.

On the contrary, when the movement radius of the user exceeds the reference radius, the one or more processors 510 may update existing location information of the user in operation 740.

Subsequently, the one or more processors 510 may perform spatial audio analysis for bitstream reconstruction in operation 750. First, the one or more processors 510 may perform analysis 751 related to diffraction and early reflection based on sound source information and geometry information needed for spatial audio rendering obtained from encoder input information. Here, the encoder input information may include information related to a sound source, geometry, an acoustic material, directivity, and the like needed for spatial audio rendering. The one or more processors 510 may perform encoding 752 of diffraction edge/path and early reflection surface/sequence information obtained through the analysis 751 related to diffraction and early reflection.

In addition, the one or more processors 510 may perform encoding 753 of acoustic material characteristic information and directivity characteristic information and may also perform serialization 754 on reverberation and diffusion-related data through analysis of reverberation and diffusion.

Subsequently, the one or more processors 510 may reconstruct a bitstream needed for spatial audio rendering in operation 760 based on (i) encoded diffraction edge/path and early reflection surface/sequence information, (ii) encoded acoustic material characteristic information and directivity characteristic information, and (iii) serialized reverberation and diffusion-related data.

Finally, in operation 770, the one or more processors 510 may update and transmit a reconstructed bitstream to a user terminal.

Figure 8:
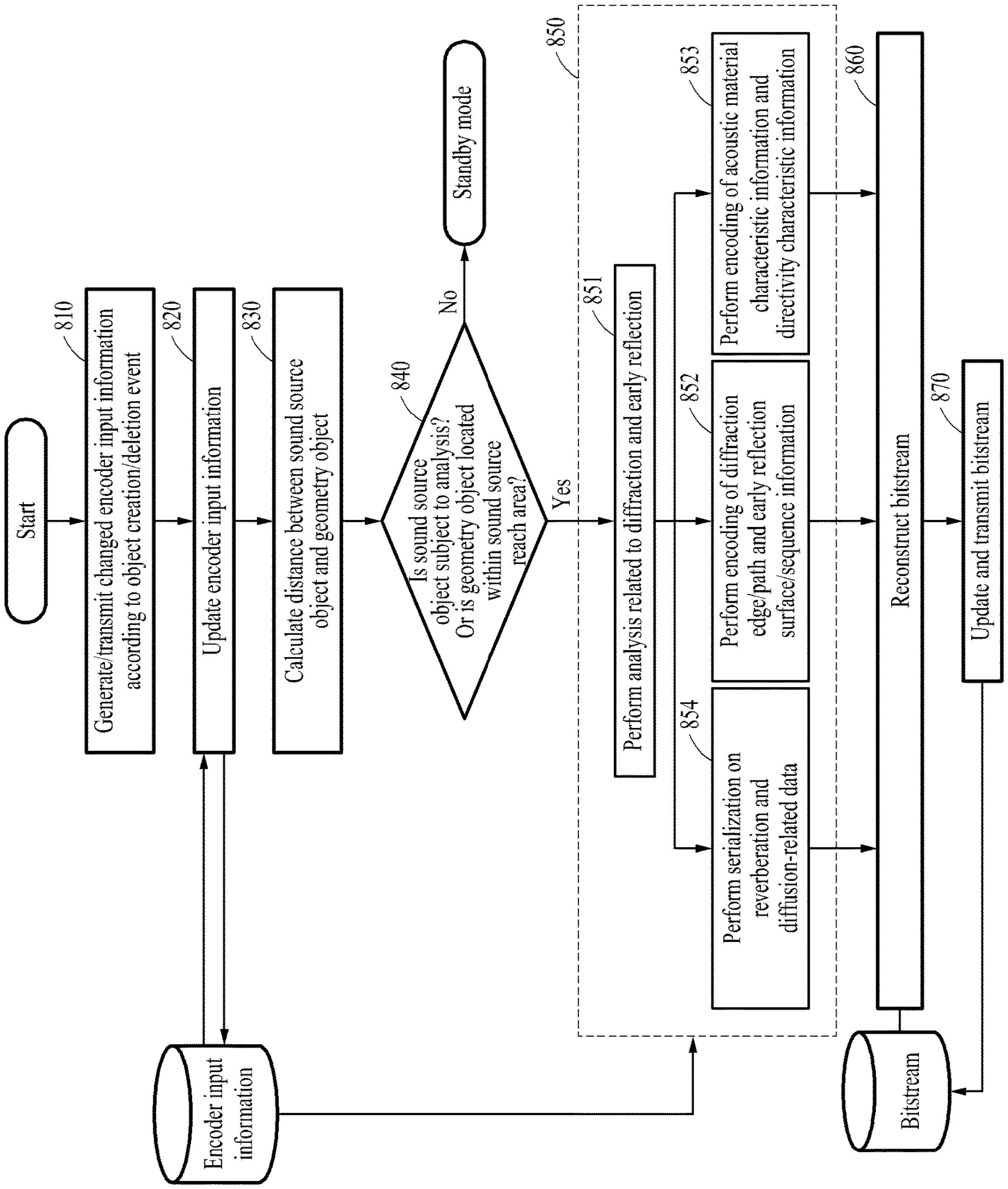
FIG. 8 illustrates an example of a bitstream reconstruction method according to object creation/deletion in a virtual space.

FIG. 8 illustrates an example of a bitstream reconstruction method according to object creation/deletion in a virtual space.

First, in operation 810, the one or more processors 510 may identify an occurrence of an object creation/deletion event in the virtual space, generate changed encoder input information, and transmit the changed encoder input information to an encoder.

In operation 820, the one or more processors 510 may update the encoder input information based on the received changed encoder input information.

In operation 830, the one or more processors 510 may calculate the distance between an individual sound source object and an individual geometry object based on updated encoder input information. More specifically, the one or more processors 510 may calculate the distance of a newly created/deleted individual sound source object and a newly created/deleted individual geometry object from an initial location of a user.

In operation 840, the one or more processors 510 may determine whether the newly created or deleted individual sound source object is subject to an analysis related to spatial audio rendering (for example, the sound sources #N and #(N−1) of FIG. 6) and whether the newly created or deleted individual geometry object is located within a sound source reach area of the sound source object that is subject to the analysis.

When the newly created or deleted individual sound source object is not subject to the analysis related to spatial audio rendering, or when the newly created or deleted individual geometry object is not located within the sound source reach distance of the sound source object that is subject to the analysis, the one or more processors 510 may switch to a standby mode.

On the contrary, when the newly created or deleted individual sound source object is subject to the analysis related to spatial audio rendering, or when the newly created or deleted individual geometry object is located within the sound source reach area of the sound source object that is subject to the analysis, the one or more processors 510 may perform spatial audio analysis for bitstream reconstruction in operation 850.

First, the one or more processors 510 may perform analysis 851 related to diffraction and early reflection based on sound source information and geometry information needed for spatial audio rendering obtained from encoder input information. Here, the encoder input information may include information related to a sound source, geometry, an acoustic material, directivity, and the like needed for spatial audio rendering. The one or more processors 510 may perform encoding 852 of diffraction edge/path and early reflection surface/sequence information obtained through the analysis 851 related to diffraction and early reflection.

In addition, the one or more processors 510 may perform encoding 853 of acoustic material characteristic information and directivity characteristic information and may also perform serialization 854 on reverberation and diffusion-related data through analysis of reverberation and diffusion.

Subsequently, the one or more processors 510 may reconstruct a bitstream needed for spatial audio rendering in operation 860 based on (i) encoded diffraction edge/path and early reflection surface/sequence information, (ii) encoded acoustic material characteristic information and directivity characteristic information, and (iii) serialized reverberation and diffusion-related data.

Finally, in operation 870, the one or more processors 510 may update and transmit a reconstructed bitstream to a user terminal.

The examples described herein may be implemented using hardware components, software components, and/or combinations thereof. A processing device may be implemented using one or more general-purpose or specialpurpose computers, such as, for example, a processor, a controller, an arithmetic logic unit (ALU), a DSP, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be stored in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), random-access memory (RAM), flash memory, and the like. Examples of program instructions include both machine code, such as those produced by a compiler, and files containing higher-level code that may be executed by the computer using an interpreter.

The above-described hardware devices may be configured to act as one or more software modules in order to perform the operations of the above-described examples, or vice versa.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. A bitstream reconstruction method comprising:

constructing an initial bitstream by rendering sound source information and geometry information within a reference radius from an initial location of a user accessing a virtual space into spatial audio;

collecting location information according to a movement of the user within the virtual space;

determining a transition area based on the reference radius when a movement radius identified according to the collected location information exceeds the reference radius;

identifying a circular area of which a radius is a distance from the initial location of the user to an identification location of an individual sound source object located at the greatest distance from the initial location of the user among individual sound source objects of which an acoustic signal reaches within the determined transition area; and reconstructing the initial bitstream by rendering sound source information and geometry information included in the identified circular area into spatial audio.

2. The bitstream reconstruction method of claim 1, wherein the sound source information comprises:

an acoustic reach distance from the identified location that is determined based on an identification location of an individual sound source object that exists within the reference radius from the initial location of the user and a type of the individual sound source object.

3. The bitstream reconstruction method of claim 2, wherein the acoustic reach distance is determined using a distance attenuation gain threshold value that is set to different values according to a type of the individual sound source object.

4. The bitstream reconstruction method of claim 1, wherein the sound source information comprises:

directivity characteristic information indicating an amount of energy emitted from the individual sound source object according to an azimuth angle and an elevation angle.

5. The bitstream reconstruction method of claim 1, wherein the geometry information comprises:

acoustic material characteristic information classified by a frequency range in order to simulate a change in a characteristic, due to an individual geometry object, of an acoustic signal that is transmitted from an individual sound source object included in the sound source information to the user.

6. The bitstream reconstruction method of claim 5, wherein the acoustic material characteristic information comprises:

at least one parameter among a coupling coefficient, a specular reflection coefficient, a diffuse scattering coefficient, or a transmission coefficient for the frequency range.

7. A bitstream reconstruction method comprising:

constructing an initial bitstream by rendering sound source information and geometry information within a reference radius from a location of a user accessing a virtual space into spatial audio;

identifying an occurrence of an object creation/deletion event in the virtual space;

calculating a distance from the location of the user to objects created or deleted according to the object creation/deletion event; and reconstructing the initial bitstream based on the calculated distance from the location of the user to the objects, wherein the reconstructing of the initial bitstream comprises:

when the object creation/deletion event corresponds to an individual sound source object: determining whether an acoustic signal of an individual sound source object created or deleted according to the object creation/deletion event reaches within a transition area determined based on the reference radius;

identifying, when it is determined that the acoustic signal of the created or deleted individual sound source object reaches within the determined transition area, a circular area of which a radius is a distance from the location of the user to an identification location of an individual sound source object located at the greatest distance from the location of the user among individual sound source objects of which an acoustic signal reaches within the determined transition area, the individual sound source objects comprising the created or deleted individual sound source object; and reconstructing the initial bitstream by rendering sound source information and geometry information included in the identified circular area into spatial audio; and when the object creation/deletion event corresponds to an individual geometry object: determining whether an individual geometry object created or deleted according to the object creation/deletion event exists within an acoustic reach distance of an individual sound source object included in a transition area determined based on the reference radius;

identifying, when it is determined that the created or deleted individual geometry object exists within the acoustic reach distance of the individual sound source object included in the transition area, a circular area of which a radius is a distance from the location of the user to an identification location of an individual sound source object located at the greatest distance from the location of the user among individual sound source objects of which an acoustic signal reaches within the determined transition area; and reconstructing the initial bitstream by rendering sound source information corresponding to the identified circular area and geometry information comprising the created or deleted individual geometry object into spatial audio.

8. A bitstream reconstruction apparatus comprising:

one or more processors; and a memory configured to load or store a program executed by the one or more processors, wherein the program comprises instructions that, when executed by the one or more processors, cause the one or more processors to perform:

constructing an initial bitstream by rendering sound source information and geometry information within a reference radius from an initial location of a user accessing a virtual space into spatial audio;

collecting location information according to a movement of the user within the virtual space;

determining a transition area based on the reference radius when a movement radius identified according to the collected location information exceeds the reference radius;

identifying a circular area of which a radius is a distance from the initial location of the user to an identification location of an individual sound source object located at the greatest distance from the initial location of the user among individual sound source objects of which an acoustic signal reaches within the determined transition area; and reconstructing the initial bitstream by rendering sound source information and geometry information included in the identified circular area into spatial audio.

9. The bitstream reconstruction apparatus of claim 8, wherein the sound source information comprises:

an acoustic reach distance from the identified location that is determined based on an identification location of an individual sound source object that exists within the reference radius from the initial location of the user and a type of the individual sound source object.

10. The bitstream reconstruction apparatus of claim 9, wherein the acoustic reach distance is determined using a distance attenuation gain threshold value that is set to different values according to a type of the individual sound source object.

11. The bitstream reconstruction apparatus of claim 8, wherein the sound source information comprises:

directivity characteristic information indicating an amount of energy emitted from the individual sound source object according to an azimuth angle and an elevation angle.

12. The bitstream reconstruction apparatus of claim 8, wherein the geometry information comprises:

acoustic material characteristic information classified by a frequency range in order to simulate a change in a characteristic, due to an individual geometry object, of an acoustic signal that is transmitted from an individual sound source object included in the sound source information to the user.

13. The bitstream reconstruction apparatus of claim 12, wherein the acoustic material characteristic information comprises:

at least one parameter among a coupling coefficient, a specular reflection coefficient, a diffuse scattering coefficient, or a transmission coefficient for the frequency range.

* * * * *